(12) United States Patent  (10) Patent No.: US 7,447,831 B2
Dreps et al.  (45) Date of Patent: Nov. 4, 2008

(54) MEMORY SYSTEMS FOR AUTOMATED COMPUTING MACHINERY

(75) Inventors: Daniel M. Dreps, Georgetown, TX (US); Kevin C. Gower, LaGrangeville, NY (US); Warren E. Maule, Cedar Park, TX (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 11/383,989

(22) Filed: May 18, 2006

(65) Prior Publication Data

US 2008/0005496 A1  Jan. 3, 2008

(51) Int. Cl.
 *G06F 13/14* (2006.01)
(52) U.S. Cl. ...................................... 711/105
(58) Field of Classification Search ................. 711/105, 711/154, 157
See application file for complete search history.

(56) References Cited

U.S. PATENT DOCUMENTS

| 6,819,625 | B2 * | 11/2004 | Ruckerbauer et al. .. 365/189.18 |
| 7,249,232 | B2 * | 7/2007 | Halbert et al. .............. 711/157 |
| 2005/0149662 | A1 | 7/2005 | Perego et al. |
| 2005/0210216 | A1 | 9/2005 | Jobs et al. |
| 2005/0213611 | A1 | 9/2005 | James |
| 2006/0095671 | A1 | 5/2006 | Gower et al. |

* cited by examiner

*Primary Examiner*—Kevin Ellis
(74) *Attorney, Agent, or Firm*—Biggers & Ohanian, LLP

(57) ABSTRACT

Memory systems are disclosed that include a memory controller and an outbound link with the memory controller connected to the outbound link. The outbound link typically includes a number of conductive pathways that conduct memory signals from the memory controller to memory buffer devices in a first memory layer; and at least two memory buffer devices in a first memory layer. Each memory buffer device in the first memory layer typically is connected to the outbound link to receive memory signals from the memory controller.

15 Claims, 9 Drawing Sheets

MEMORY SYSTEMS FOR AUTOMATED COMPUTING MACHINERY

BACKGROUND OF THE INVENTION

1. Field of the Invention

The field of the invention is memory systems for automated computing machinery.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Contemporary high performance computing main memory systems incorporate memory devices in the array of dynamic random access memory ('DRAM') devices. FIG. 1 illustrates an example of a prior art memory system that includes a memory controller (102), memory modules (124), memory buffer devices (128), and memory devices (125, 126, 127) organized in a hub-and-spoke topology, with the memory buffer devices as 'hubs' and memory devices representing 'spokes.' The memory controller (102) is interconnected to memory buffer devices (128) via one or more physical high speed, unidirectional links that include outbound links (116, 108, 112) and inbound links (120, 109, 113). Each memory buffer device provides one or more lower speed independent connections to banks of memory devices (125, 126, 127). An example of such a prior art memory system architecture is described in the Jedec standard for the so-called 'Fully Buffered Dual Inline Memory Module,' or 'FBDIMM.' The example of FIG. 1 illustrates only one 'channel' or network of memory buffer devices and links among memory buffer devices and memory controllers. Practical memory systems, however, typically may be implemented with a number of such channels or networks. Each such channel may include memory modules logically grouped together in ranks (125, 126, 127) operated in unison by the memory controller for optimal latency, bandwidth, and error correction effectiveness for system memory cache line transfer (typically 64 bytes or 128 bytes).

The memory controller (102) translates system requests from system processor (156) for memory access into packets according to the memory system network communication protocol. A memory 'write' packet of such a protocol may include a command ('read' or 'write'), and address, and associated data, and a memory 'read' packet may include a command and address. Memory read packets imply an expected packet will be returned to the memory controller containing data read from memory.

Memory access latency in memory system network topologies composed of cascaded memory buffer devices together with point-to-point electrical or optical links is degraded by having to propagate through each memory buffer device in a cascaded network of memory buffer devices between a particular rank of memory devices and a memory controller. For purposes of explanation, the transition delay for signal transition across a memory buffer device may be taken as one unit of latency. The latency for transmission of memory signals between memory controller (102) and memory devices in rank 1 (125) therefore may be said to have a value of 1. The latency for transmission of memory signals between memory controller (102) and memory devices in rank 2 (126) has a value of 2. And so on, so that the latency for transmission of memory signals between memory controller (102) and memory devices in any rank X (127) is taken as the value X.

In addition to issues with memory access latency, power consumption and cost for interfaces are both maximized by having point-to-point network connections. In the memory system of FIG. 1, for example, the memory controller and each memory buffer device drives output memory signals across the full width of each link. If there are 10 lines in an outbound link, the memory controller or memory buffer device driving the link has 10 output drivers in its output interface to the link with a power requirement to supply all 10 drivers. For all these reasons, there is an ongoing need for innovation in the field of memory systems.

SUMMARY OF THE INVENTION

Memory systems are disclosed that include a memory controller and an outbound link with the memory controller connected to the outbound link. The outbound link typically includes a number of conductive pathways that conduct memory signals from the memory controller to memory buffer devices in a first memory layer; and at least two memory buffer devices in a first memory layer. Each memory buffer device in the first memory layer typically is connected to the outbound link to receive memory signals from the memory controller.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 2:
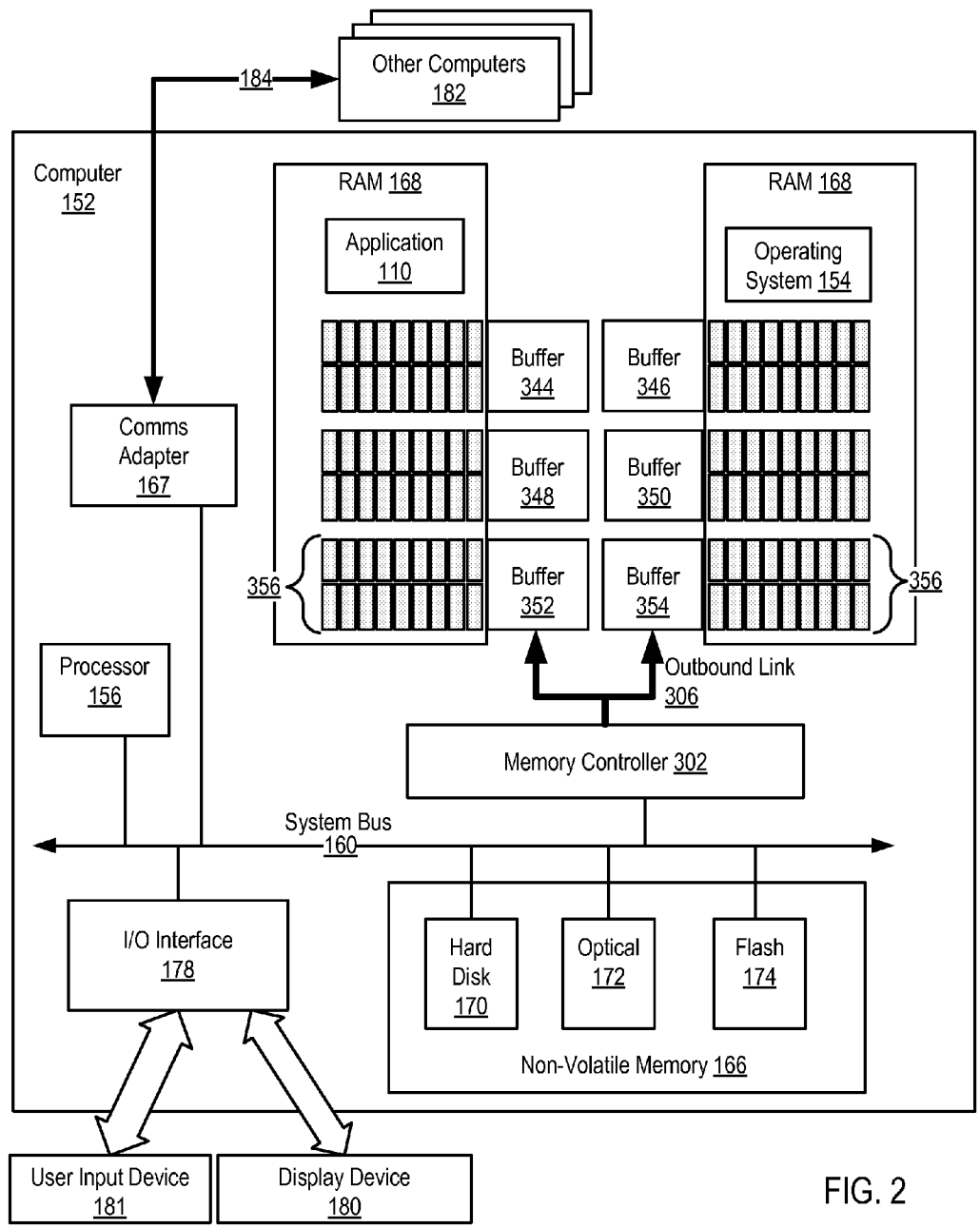
FIG. 2 sets forth a block diagram of automated computing machinery comprising an exemplary computer useful with memory systems according to embodiments of the present invention.

Exemplary memory systems according to embodiments of the present invention are described with reference to the accompanying drawings, beginning with FIG. 2. Memory systems according to embodiments of the present invention are generally implemented with computers, that is, with automated computing machinery. FIG. 2 therefore sets forth a block diagram of automated computing machinery comprising an exemplary computer (152) useful with memory systems according to embodiments of the present invention. The computer (152) of FIG. 2 includes at least one computer processor (156) as well as a memory controller (302) which is connected through a system bus (160) to processor (156) and to other components of the computer. The computer of FIG. 2 also includes an outbound link (306) of a memory signal channel. Memory controller (302) is connected to the outbound link, and the outbound link is composed of a number of conductive pathways, electrical or optical, that conduct memory signals from the memory controller to memory buffer devices (352, 354) in a first memory layer (356). There are at least two memory buffer devices (352, 354) in the first memory layer, and each memory buffer device in the first memory layer is connected to the outbound link to receive memory signals from the memory controller.

Stored in RAM (168) is an application program (110), a user-level module of computer program instructions for carrying out data processing. Also stored in RAM (168) is a computer operating system (154). Computer operating systems useful with memory systems according to embodiments of the present invention include UNIX™, Linux™, Microsoft XP™, AIX™, IBM's i5/OS™, and others as will occur to those of skill in the art. Operating system (154) and application (110) in the example of FIG. 2 are shown in RAM (168), but many components of such software typically are stored in non-volatile memory (166) also.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful with memory systems according to embodiments of the present invention include modems for wired dial-up communications, Ethernet (IEEE 802.3) adapters for wired network communications, and 802.11b adapters for wireless network communications.

Figure 3:
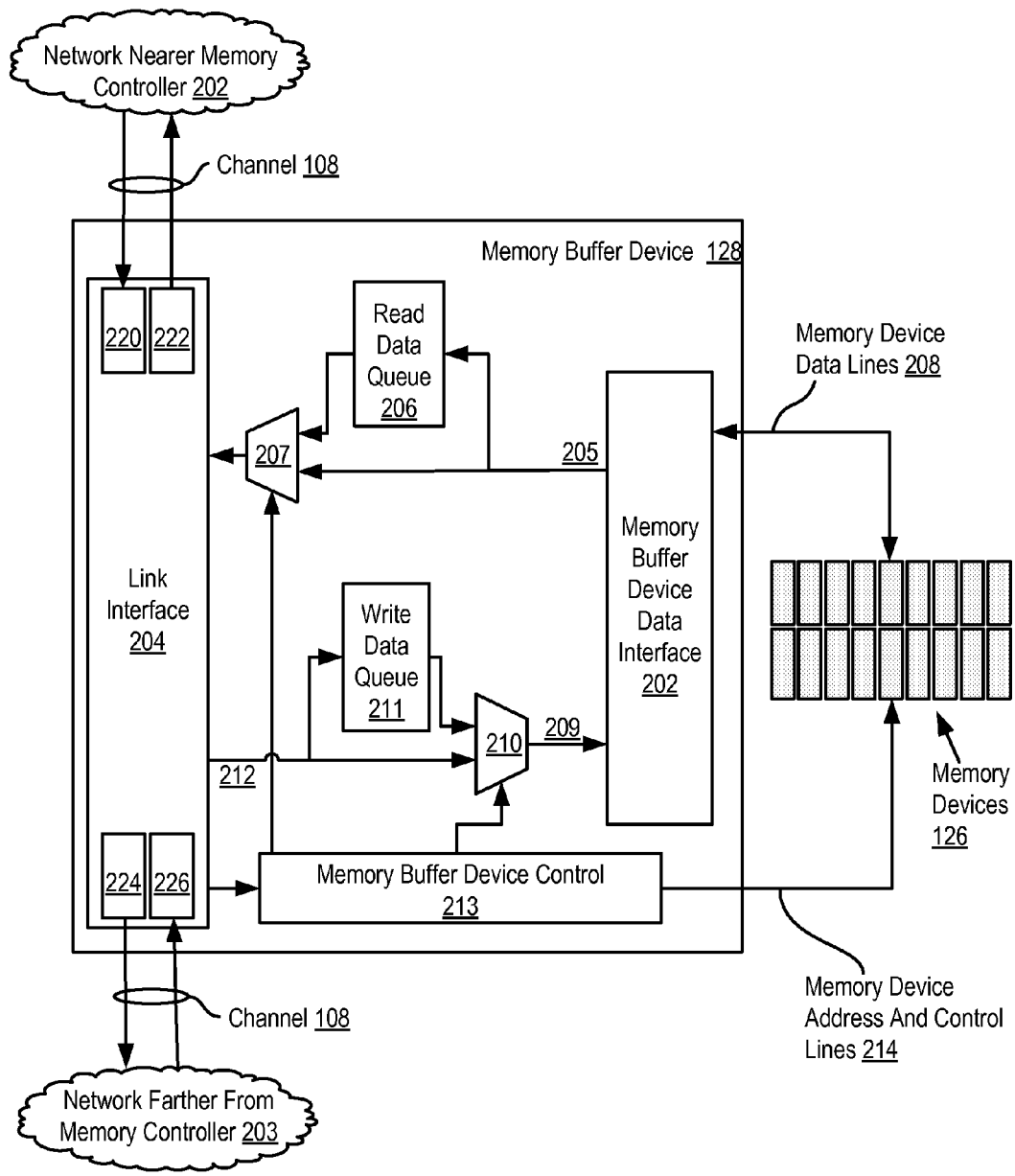
FIG. 3 sets forth a functional block diagram of an exemplary memory buffer device useful in memory systems according to embodiments of the present invention.

For further explanation, FIG. 3 sets forth a functional block diagram of an exemplary memory buffer device (128) useful in memory systems according to embodiments of the present invention. In the example of FIG. 3, memory buffer device (128) includes a link interface (204) that resynchronizes and redrives the high speed memory access traffic from memory network channel (108) to associated memory devices (126) and on through the network channel to other memory buffer devices on the channel. That is, link interface (204) receives in its outbound input receiver circuitry (220) memory signals from the memory network (202) nearer a memory controller, resynchronizes and redrives each packet of such traffic through outbound output transmitter circuitry (224) onto a network link toward the network farther from the memory controller (203). Similarly, link interface (204) receives in its inbound input receiver circuitry (226) memory signals from the memory network (203) farther from a memory controller, resynchronizes and redrives each packet of such traffic through inbound output transmitter circuitry (222) onto a network link toward the network (202) nearer the memory controller.

The speed requirements of the overall memory system mean that the link interface typically will forward each outbound packet before examining each packet. The channel speed is too fast to wait for any particular memory buffer device to determine whether a packet is intended for that memory buffer device before passing on the packet. According to the memory communications protocol of channel (108), therefore, each link interface of each memory buffer device of a channel receives each outbound packet. After forwarding each outbound packet, link interface (204) examines each outbound packet to determine whether the packet is addressed to memory served by memory buffer device (128), and, if it is, link interface (204) hands the contents of the packet off to memory buffer device control logic (213). Regarding inbound packets: Link interface (204) resynchronizes and redrives all inbound traffic without examination.

The memory buffer device control circuit (213) services packets by responsively driving memory device address and control lines (214) to direct read data flow (205) and write data flow (209). The memory buffer device (128) includes a data interface (221) that synchronizes data read from the memory devices (126) and controls a bidirectional memory data bus (208). Memory buffer device control circuit (213) uses additional control circuitry (207, 210) to effect whether data is queued (206, 211) or driven directly to or from memory. Memory write data (212) from link interface (204) can be queued (211) or directly driven to the memory devices (126) via data bus (208). Memory read data can be queued (206) or directly transferred to the link interface (204) to be transmitted on the network as a read reply packet.

Memory System Architecture: Two or More Buffers Per Memory Layer

Figure 4:
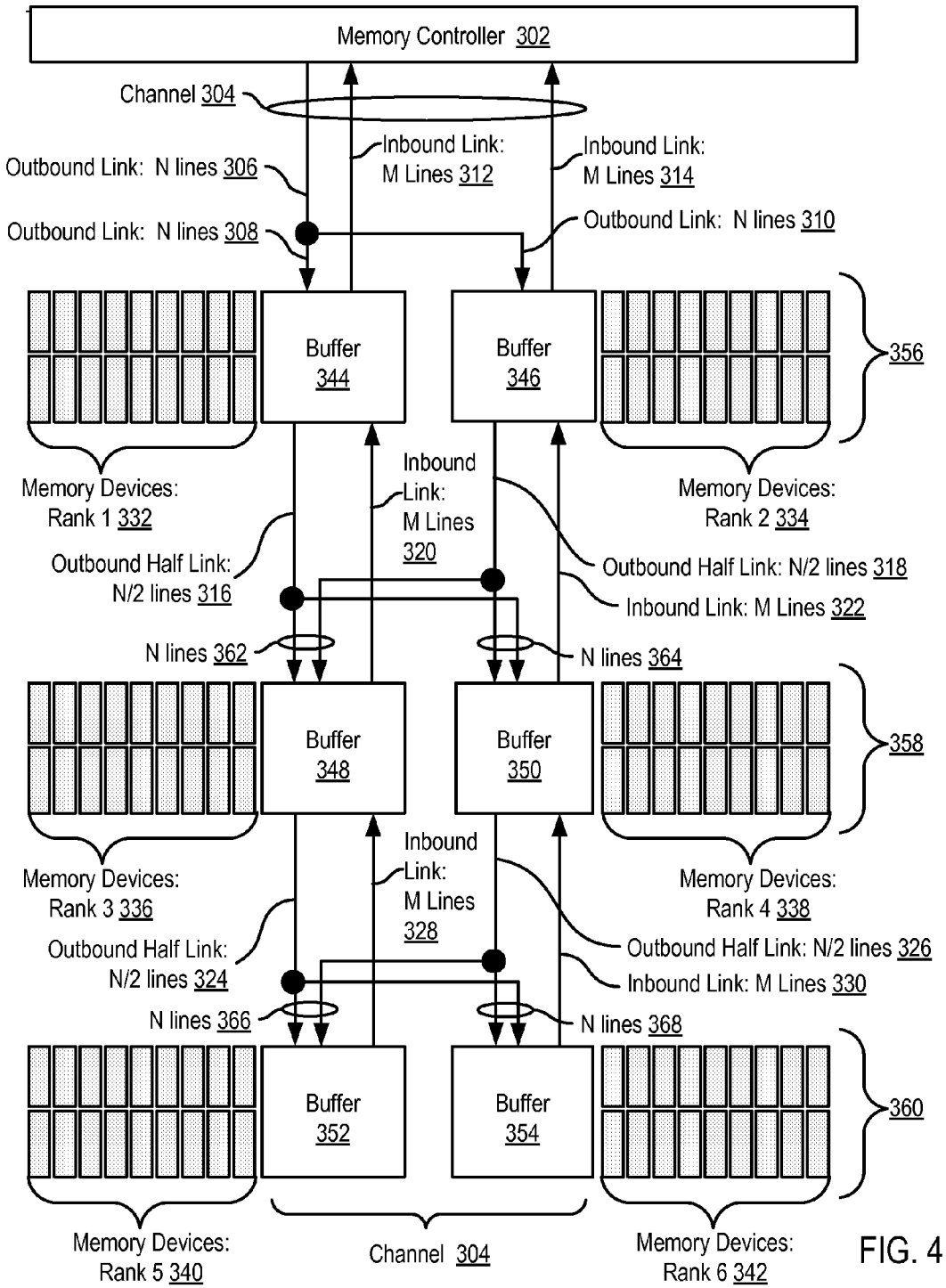
FIG. 4 sets forth a functional block diagram illustrating an exemplary memory system according to embodiments of the present invention.

For further explanation, FIG. 4 sets forth a functional block diagram illustrating an exemplary memory system according to embodiments of the present invention that includes a memory controller (302) and an outbound link (306), where the memory controller (302) is connected to the outbound link (306), and the outbound link (306) includes conductive pathways that conduct memory signals from the memory controller (302) to memory buffer devices (344, 346) in a first memory layer (356). The memory system of FIG. 4 also includes at least two memory buffer devices (344, 346) in a first memory layer (356), where each memory buffer device (344, 346) in the first memory layer is connected (308, 310) to the outbound link (306) to receive memory signals from the memory controller (302).

Memory controller (302) receives memory instructions from a computer processor (156 on FIG. 2) and generates the necessary memory signals to control the reading and writing of information from and to memory. The memory controller is normally integrated into a system chipset, often in a so-called 'northbridge.' Examples of memory controllers that may be adapted for use in memory systems according to embodiments of the present invention include the Intel™ 82845 Memory Controller Hub and the IBM™ CPC925 Northbridge.

Outbound links (306, 316, 318, and so on) together with inbound links (312, 314, 320, 322, and so on) form a memory communications channel (304) for communicating memory signals to and from memory. Links are conductive pathways, electrically conductive or optically conductive, that communicate memory signals, electrically or optically, among elements of a memory communications network: memory controllers and memory buffer devices. Links communicating memory signals on a memory channel away from a memory controller are termed 'outbound links.' Links communicating memory signals on a memory channel toward a memory controller are termed 'inbound links.'

Memory channel (304) connecting memory controller (302) and memory buffer devices (344, 346, 348, 350, 352, 354) composes a memory communications network. In this example, memory is represented by several ranks (332, 334, 336, 338, 340, 342) of memory devices. Each rank contains a multiplicity of individual memory devices which typically may be implemented as various kinds of dynamic or static random access memory. Memory in the example of FIG. 4 also is organized in levels (356, 358, 360) with each level containing at least two memory buffer devices: memory buffer devices (344, 346) in memory level (356), memory buffer devices (348, 350) in memory level (358), and memory buffer devices (352, 354) in memory level (360).

Outbound Cascaded Architecture: Partial Outbound Links

The example memory system of FIG. 4 includes additional outbound links (316, 318). Each additional outbound link includes a number of conductive pathways connected to a memory buffer device (344, 346) of the first memory layer so as to conduct memory signals from a memory buffer device in the first memory layer to two or more additional memory buffer devices (348, 350) in an additional memory layer (358). Each additional outbound link (316, 318) is composed of a number of conductive pathways smaller than the number of conductive pathways in the outbound link (306) connecting the memory controller (302) to the memory buffer devices (344, 346) in the first memory layer (356). In this example, each additional outbound link (316, 318) is composed of a number of conductive pathways equal to one-half (N/2) the number of conductive pathways (N) in the outbound link (306) connecting the memory controller to the memory buffer devices in the first memory layer.

The exemplary memory system of FIG. 4 also includes the at least two additional memory buffer devices (348, 350) in an additional memory layer (358), where each additional memory buffer device is connected (362, 364) to at least two of the additional outbound links (in this example, exactly two: 316 and 318) so as to receive all memory signals transmitted from the memory controller on the outbound link (306) between the memory controller (302) and the memory buffer devices (344, 346) in the first memory layer (356).

That is, in the example of FIG. 4, outbound links to additional memory layers beyond the first memory layer are partial links. In particular, in this example, outbound links to additional memory layers beyond the first memory layer are half links. If the outbound link from the memory controller to the first layer of memory were to include 10 lines, then the outbound links to additional memory layers each would have only 5 lines. If the outbound link from the memory controller to the first layer of memory were to include an uneven number of lines, say 10 lines for example, then, assuming that there were two outbound links per additional memory layer, one outbound link to additional memory layers could have 5 lines and the other could have 6.

Link lines are gathered at the inputs to memory buffers in additional memory layers so that each buffer in each additional memory layer is presented with a complete outbound link. Thus outbound half link (316) and outbound half link (318) are gathered into a full link (362) at the outbound input to buffer (348) of additional memory layer (358). Outbound half link (316) and outbound half link (318) are gathered into a full link (364) at the outbound input to buffer (350) of additional memory layer (358). Outbound half link (324) and outbound half link (326) are gathered into a full link (366) at the outbound input to buffer (352) of additional memory layer (360). Outbound half link (324) and outbound half link (326) are gathered into a full link (368) at the outbound input to buffer (354) of additional memory layer (360). And so on, not only for the two additional memory layers shown here (358 360), but for any number of additional memory layers.

Figure 1:
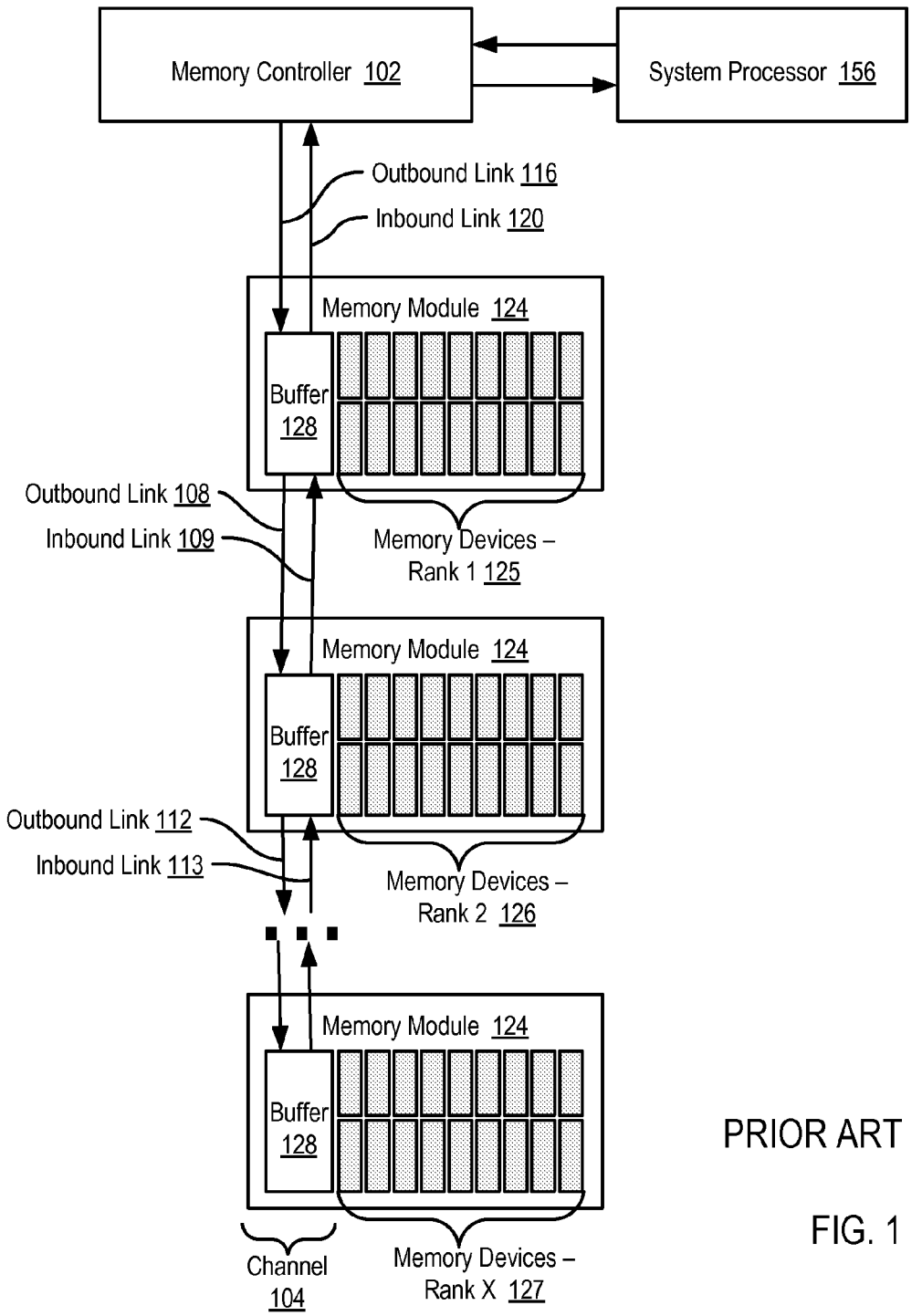
FIG. 1 illustrates an example of a prior art memory system that includes a memory controller, memory modules, memory buffer devices, and memory devices organized in a hub-and-spoke topology.

In view of this explanation, readers will recognize that the benefits of the outbound link architecture of the example of FIG. 4 include a substantial reduction in the physical complexity of the outbound channel lines and substantial reduction in power consumption in output driver circuitry of memory buffer devices which now need have only about one-half the outbound output driver circuits required, for example, by a prior art system such as the one illustrated in FIG. 1.

Channel Protocol

Figure 5:
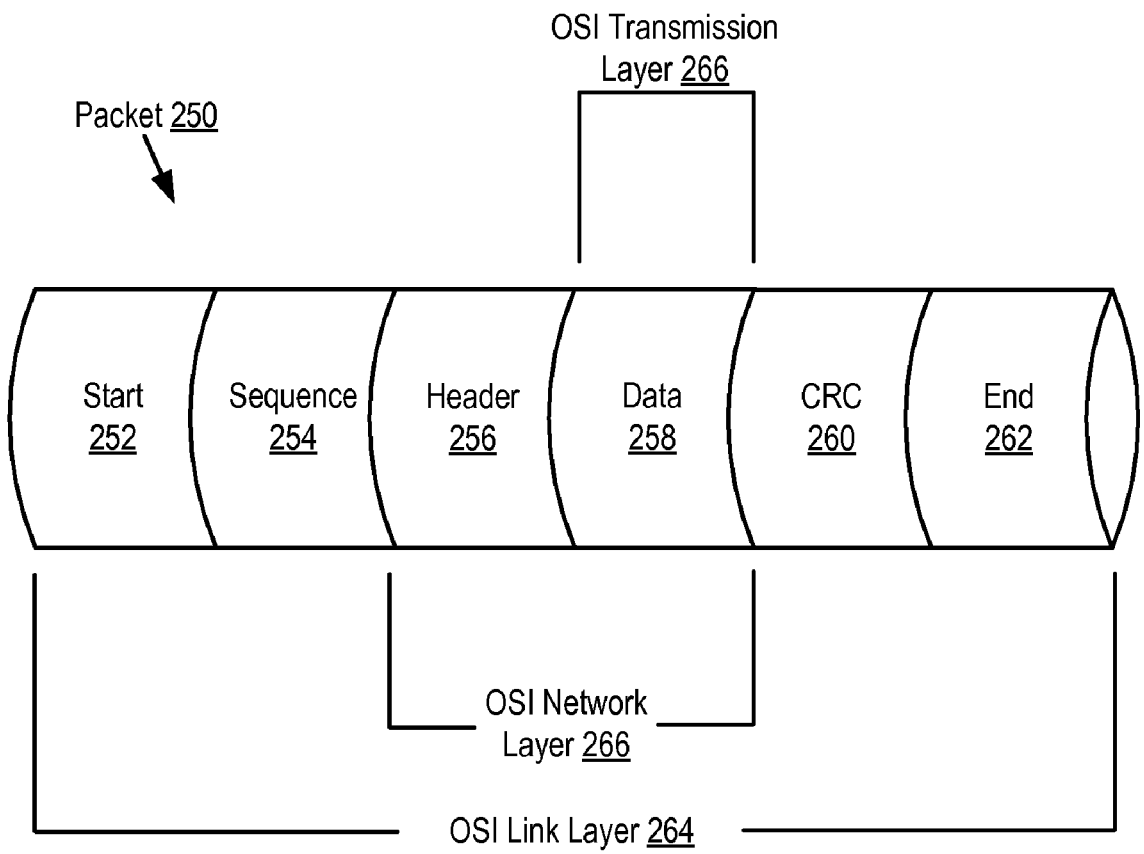
FIG. 5 sets forth a line drawing illustrating an exemplary memory signal packet structure useful in various memory systems according to embodiments of the present invention.
Figure 5:
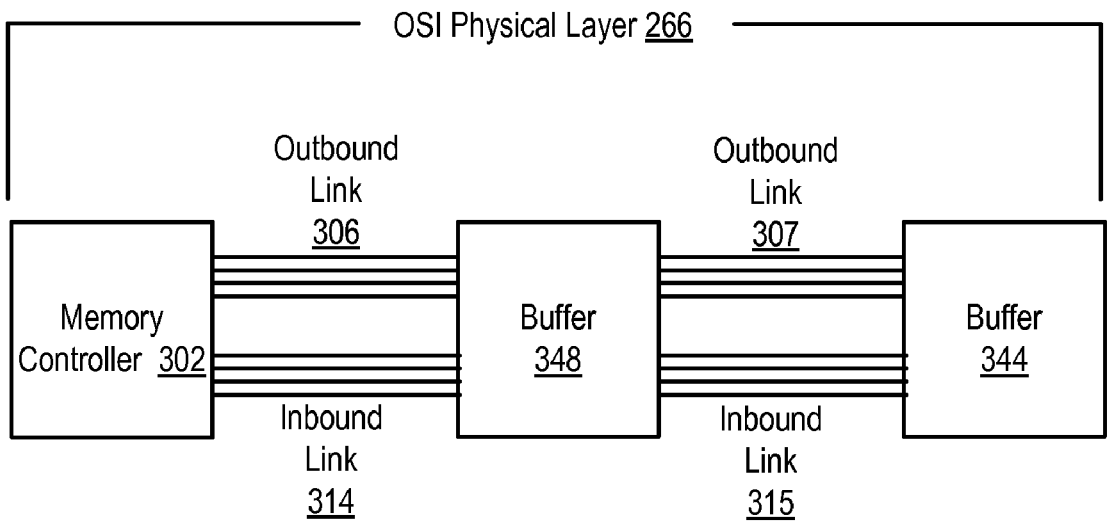

For further explanation, FIG. 5 sets forth a line drawing illustrating an exemplary memory signal packet structure useful in various memory systems according to embodiments of the present invention. FIG. 5 includes also illustrates an exemplary implementation of the first four layers of the International Organization for Standardization ('OSI') data communications stack useful in various memory systems according to embodiments of the present invention. The example packet (250) of FIG. 5 frame is made up of a 1-byte packet start field (252), a 2-byte sequence number, a 20-byte header, 0 to 4096-byte data field, a 0 to 4-byte cyclic redundancy check field, and a 1-byte packet end field.

The header field may contain data identifying the packet type (whether a particular packet represents an instruction to write data to memory or an instruction to read data from memory), a memory address where data is to be written to or read from, and the quantity of data to be read or written. A cyclic redundancy check ('CRC') is a hash function used to produce a checksum, a small number of bits, against a larger block of data, such as a packet of network traffic. The checksum is used to detect and correct errors after transmission or storage. A CRC value is computed and appended before transmission and verified afterwards by a recipient to confirm that no changes occurred during transit. CRCs are particularly good at detecting common errors caused by noise in transmission channels.

Memory systems according to embodiments of the present invention may be viewed as implementing the lower layers of the OSI stack. The OSI transmission layer (267) is represented by memory instructions, that is, read or write requests, from a processor to a memory controller. The next two stack levels down take this read or write request and convert it into a packet by appending routing and flow control information, as well as CRC information, placing it in a frame, and then sending it to its destination.

The OSI network layer (266) is represented by a packet organization that sends and receives data to and from particular ranks of memory administered by particular memory buffer devices—addressed in effect by packet header data. The OSI link layer (264) encapsulates the header (256) and data (258) in a packet (250) with a packet start field (252), a sequence number (254), a CRC value (260), and an end field (262). The OSI physical layer (266) is composed of the actual hardware of a memory communications network: memory controller (302), memory buffer devices (348, 344), and links (306, 307, 314, 315) among the memory controller and the memory buffer devices.

The data communications protocol for memory communications channels according to embodiments of the present invention is a high speed, serial protocol in which a sequence of serial packet bits is transmitted in bursts mapped onto a set of parallel link lines. A link can have any number of lines. A typical (but still optional) size for an outbound link is 10 lines, and a typical (still optional) size for an inbound link is 14 lines.

Outbound Synchronization

In the memory system of FIG. 4, the memory buffer devices (344, 346) in the first memory layer (356) are synchronized with one another for receipt of outbound memory signals through the outbound link (306). In the memory system of FIG. 4, synchronizing the memory buffer devices in the first memory layer with one another may be carried out, for example, by synchronizing at the same time each memory buffer device (344, 346) in the first memory layer with the memory controller (302) to a predetermined threshold measure of synchronization.

Figure 6:
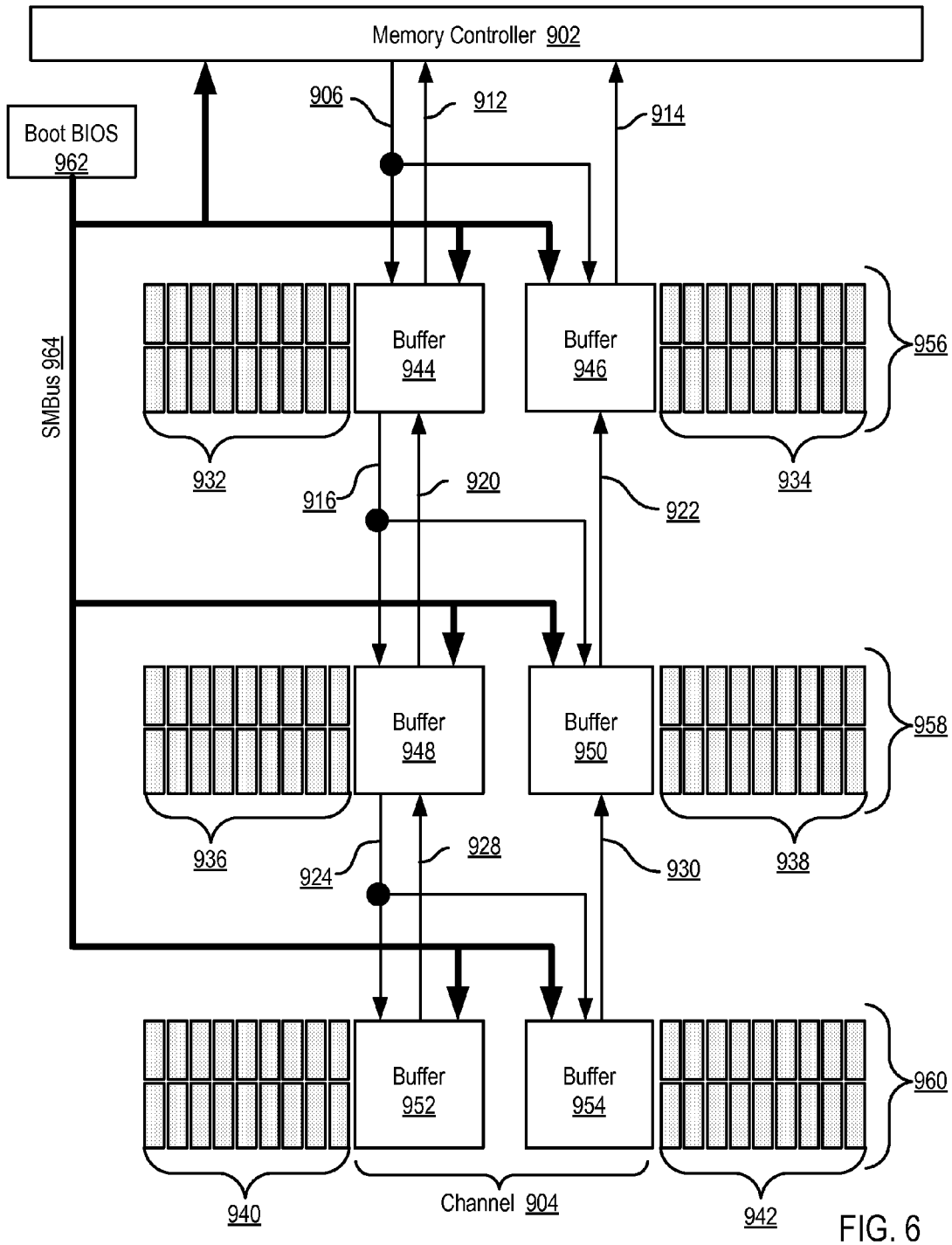
FIG. 6 sets forth a functional block diagram illustrating a further exemplary memory system according to embodiments of the present invention.

For further explanation, FIG. 6 sets forth a functional block diagram illustrating a further exemplary memory system according to embodiments of the present invention that, like the exemplary memory system of FIG. 4, includes a memory controller (902) and an outbound link (906), where the memory controller (902) is connected to the outbound link (906), and the outbound link (906) is composed of conductive pathways that conduct memory signals from the memory controller (902) to memory buffer devices (944, 946) in a first memory layer (956).

Synchronization operates to maximize the period of time when valid data can be reliably detected as a 1 or a 0, known as the "data eye." Synchronization occurs at a given frequency. While a device, a memory controller or memory buffer device, designated as a sender sends predetermined signal patterns simultaneously to two memory buffer devices designated as receivers on a link, the receivers adjusts their clocks to data skew for each signal and also may adjust receiver electrical characteristics to maximize the "data eye" width in picoseconds. At boot time, the high speed memory channel (904) is not yet synchronized, so in-band communication of synchronization instructions through the high speed channel is not available. Synchronization may be initiated by having in-band signals initially operate at very low speed during configuration prior to synchronization. Or synchronization may be automatically started responsive to a reset pin assertion and carried out by logic state machines on either side of a link. Alternatively, a boot module in the computer's Basic Input/Output System ('BIOS') (962) may communicate synchronization instructions to the memory controller (902) and to memory buffer devices (944, 946) through an out-of-band network such as an I$^2$C bus or a System Management Bus ('SMBus' or 'SMB') such as the one illustrated at reference (964) on FIG. 6.

In the example of FIG. 4, each memory buffer device (344, 346) in the first memory layer is synchronized at the same time with the memory controller (302) to a predetermined threshold measure of synchronization by designating the memory controller as a sender and each memory buffer device as a simultaneous receiver, instructing the sender to send a series of test patterns to both receivers at the same time, and measuring the quality of synchronization as the width of a link signal eye measured in picoseconds on each receiver. The predetermined threshold measure of synchronization is a minimum required link signal eye width measured in picoseconds, such as, for example, 200 picoseconds or 250 picoseconds.

In an example, therefore, where the predetermined threshold measure of synchronization is set to 200 picoseconds, where a first memory buffer device in a first memory layer synchronized with a memory controller with a 200 picosecond signal eye and a second memory buffer device in the first memory layer synchronized at the same time with the memory controller with a 225 picosecond signal eye, the two memory buffer devices would be considered synchronized with one another. In a further example given the same 200 picosecond predetermined threshold measure of synchronization, where a first memory buffer device in the first memory layer synchronized with a memory controller with a 200 ps. eye and a second memory buffer device in the first memory layer synchronized at the same time with the memory controller with a 175 ps. eye, the two memory buffer devices would not be considered synchronized with one another— and the second memory buffer device adjusts its clock to data skew or its receiver electrical characteristics until its link signal eye width is at least 200 picoseconds.

Outbound Cascaded Synchronization

In the memory system of FIG. 4, the memory buffer devices (348, 350) in the additional memory layer (358) are synchronized with one another for receipt of outbound memory signals through the outbound link. Synchronizing the memory buffer devices in an additional memory layer with one another may be carried out, for example, by synchronizing at the same time each memory buffer device in the additional memory layer to a predetermined threshold measure of synchronization with a memory buffer device in the first layer of memory to which the memory buffer devices in the second layer of memory are connected by an outbound link.

As mentioned above, FIG. 6 sets forth a functional block diagram illustrating an exemplary memory system according to embodiments of the present invention that, like the exemplary memory system of FIG. 4, includes a memory controller (902) and an outbound link (906), where the memory controller (902) is connected to the outbound link (906), and the outbound link (906) is composed of conductive pathways that conduct memory signals from the memory controller (902) to memory buffer devices (944, 946) in a first memory layer (956).

Synchronization operates to maximize the period of time when valid data can be reliably detected as a 1 or a 0, known as the "data eye." Synchronization occurs at a given frequency. While one memory buffer device designated a sender sends predetermined signal patterns simultaneously to two memory buffer devices designated receivers on a link, the receivers adjusts their clocks to data skew for each signal and also may adjust receiver electrical characteristics to maximize the "data eye" width in picoseconds. At boot time, the high speed memory channel (904) is not yet synchronized, so in-band communication of synchronization instructions through the high speed channel is not available. So, as mentioned above synchronization may be initiated by use of low speed in-band signals, a reset pin assertion, or by use of an out-of-band network like an I²C bus or a System Management Bus ('SMBus' or 'SMB'), reference (964) on FIG. 6.

In the example of FIG. 4, each memory buffer device (348, 350) in the second memory layer (358) is synchronized at the same time with memory buffer devices (344, 346) in the first memory layer (356) to a predetermined threshold measure of synchronization by designating memory buffer device (344) as sender and both memory buffer devices (348, 350) as simultaneous receivers, instructing the sender to send a series of test patterns to both receivers at the same time, and measuring the quality of synchronization as the width of a link signal eye measured in picoseconds on each receiver. The predetermined threshold measure of synchronization is a minimum required link signal eye width measured in picoseconds, such as, for example, 200 picoseconds or 250 picoseconds.

In an example, therefore, where the predetermined threshold measure of synchronization is set to 200 picoseconds, where a first memory buffer device in a second memory layer synchronized with a memory buffer device in a first layer of memory with a 200 picosecond signal eye and a second memory buffer device in the second memory layer synchronized at the same time with the memory buffer device in the first layer of memory with a 225 picosecond signal eye, the two memory buffer devices would be considered synchronized with one another. In a further example given the same 200 picosecond predetermined threshold measure of synchronization, where a first memory buffer device in the second memory layer synchronized with a memory buffer device in a first layer of memory with a 200 picosecond eye and a second memory buffer device in the second memory layer synchronized at the same time with the memory buffer device in a first layer of memory with a 175 picosecond eye, the two memory buffer devices in the second layer of memory would not be considered synchronized with one another—and the second memory buffer device in the second layer of memory adjusts its clock to data skew or its receiver electrical characteristics until its link signal eye width is at least 200 picoseconds.

Readers will recognize that although initial synchronization has been described in the example of FIG. 6 with reference to outbound synchronization only for two memory layers (956, 958), such synchronization methodology may be extended to a third memory layer (960), to any number of additional memory layers, and to the inbound case for any number of memory layers as well.

Inbound Architecture: Plural Full Inbound Links Per Channel

Again with reference to FIG. 4: The memory system of FIG. 4 includes a plurality of separate inbound links (312, 314), with one such inbound link (312, 314) connected from each memory buffer device (344, 346) in the first memory layer (356) to the memory controller (302) for transmission of memory signals from each memory buffer device in the first memory layer to the memory controller. That is, inbound link (312) is connected from memory buffer device (344) in the first memory layer (356) to memory controller (302) for transmission of memory signals from memory buffer device (344) to memory controller (302), and inbound link (314) is connected from memory buffer device (346) in the first memory layer (356) to memory controller (302) for transmission of memory signals from memory buffer device (346) to memory controller (302).

Inbound Cascaded Architecture: Plural Full Inbound Links Per Channel

The memory system of FIG. 4 also includes additional inbound links (320, 322). Each additional inbound link is composed of a number of conductive pathways, electrically conductive or optically conductive, connected to a memory buffer device (344, 346) of the first memory layer (356) so as to conduct to the memory buffer device of the first memory layer memory signals from an additional memory buffer device (348, 350) of an additional memory layer (358). In the example of FIG. 4, each additional inbound link (320, 322) includes a number of conductive pathways that is equal to the number of conductive pathways in the inbound links (312, 310) connecting the memory controller (302) to the memory buffer devices (344, 346) in the first memory layer (356).

The memory system of FIG. 4 also includes the at least two additional memory buffer devices (348, 350) in an additional memory layer (358). Each additional memory buffer device is connected to one of the additional inbound links (320, 322) so as to send from the additional memory buffer device (348, 350) to one of the memory buffer devices (344, 346) of the first level of memory all memory signals to be transmitted to the memory controller from each memory buffer device of the first memory layer. That is, inbound link (320) carries all memory signals from memory buffer device (348) to be transmitted from memory buffer device (348) through memory buffer device (344) to memory controller (302), and inbound link (322) carries all memory signals from memory buffer device (350) to be transmitted from memory buffer device (350) through memory buffer device (346) to memory controller (302).

In view of this explanation, readers will recognize that the benefits of the inbound link architecture of the example of FIG. 4 include a substantial reduction in read latency by comparison with a prior art system such as the one illustrated in FIG. 1. Read latency for memory rank 1 is 1 in the memory system of FIG. 4 and in the prior art memory system of FIG. 1, but the read latency for all other ranks, measured in memory buffer device delays, is substantially reduced:

Read latency for memory rank 2 is 1 in the memory system of FIG. 4, while read latency for memory rank 2 in the prior art memory system of FIG. 1 is 2.

Read latency for memory rank 3 is 2 in the memory system of FIG. 4, while read latency for memory rank 3 in the prior art memory system of FIG. 1 is 3.

Read latency for memory rank 4 is 2 in the memory system of FIG. 4, while read latency for memory rank 4 in the prior art memory system of FIG. 1 is 4.

Read latency for memory rank 5 is 3 in the memory system of FIG. 4, while read latency for memory rank 5 in the prior art memory system of FIG. 1 is 5.

Read latency for memory rank 6 is 3 in the memory system of FIG. 4, while read latency for memory rank 6 in the prior art memory system of FIG. 1 is 6.

And so on.

Inbound Link Speed Dependent Upon Outbound Speed and Configuration

The memory system of FIG. 4 includes, in this example, at least two layers (356, 358, 360) of memory, where each memory layer includes at least two memory buffer devices (344, 346, 348, 350, 352, 354). In the example of FIG. 4, each layer of memory is connected for communication of memory signals by at least one outbound link (306, 316, 318, 324, 326) to at least one memory buffer device in the memory layer. In addition, each layer of memory is connected for communication of memory signals by at least one inbound link (312, 314, 320, 322, 328, 330) from at least one memory buffer device in the memory layer. The inbound links are characterized by an inbound link speed, and the outbound links are characterized by an outbound link speed.

In this example, moreover, the inbound link speed is dependent upon the outbound link speed. The inbound link speed is dependent upon the outbound link speed in this example because the channel architecture in this example includes more than one inbound link from each memory layer. The channel architecture includes two inbound links (312, 314) from the first memory layer (356) to the memory controller. The channel architecture includes two inbound links (320, 322) from the second memory layer (356) to the first memory layer (356). And so on. Each inbound link is a full link; if a full link includes M lines, each inbound link includes M lines. If M=14, each inbound link has all 14 lines.

The fact that there are more than one inbound link from each memory layer in the example of FIG. 4 means that on average, each inbound link need have only half the speed of the outbound links. Each memory address buffer administers memory devices representing a separate segment of the overall memory address space. In this example, there are two memory buffer devices per memory layer, and each memory buffer device administers a rank of memory of the same size. Each memory buffer device in a memory layer receives and decodes all memory signals addressed to all memory buffer devices in the layer, but on average, with each memory address buffer serving the same size memory rank, read responses will only occur from each memory address buffer for one-half of the read requests addressed to both buffers.

It is instructive to contrast the architecture of the memory system of FIG. 4 with the architecture of the prior art memory system of FIG. 1 in which each read request to each memory buffer device results in exactly one read response from that memory buffer device. For these reasons, in the example of FIG. 4, the inbound link speed, dependent upon the outbound link speed, need be no more than one-half the inbound link speed, thereby reducing link design difficulty and power requirements by comparison with prior art memory systems.

Readers will notice also that rather than reducing inbound link speed in the architecture of the memory system of FIG. 4, it is possible to reduce the number of inbound lines in each inbound link and achieve the same effect by leaving the overall inbound link speed unchanged. In other words, with two inbound links from each memory layer, there are two ways to achieve a given inbound bandwidth: reduce the clock speed on the inbound links or leave the clock speed the same and reduce the number of lines per link. Either way provides benefits with respect to prior art methods. Slower clock speed is easier to design and implement. Fewer lines mean less design difficulty, lower materials cost, and less manufacturing expense.

Outbound Cascaded Architecture: Full Outbound Links From Less Than All Buffers In A Memory Layer For further explanation, FIG. 7 sets forth a functional block diagram illustrating a further exemplary memory system according to embodiments of the present invention that, like the exemplary memory system of FIG. 4, includes a memory controller (402) and an outbound link (406), where the memory controller (402) is connected to the outbound link (406), and the outbound link (406) is composed of conductive pathways that conduct memory signals from the memory controller (402) to memory buffer devices (444, 446) in a first memory layer (456). Unlike the memory system of FIG. 4, however, the memory system of FIG. 7 also includes an additional outbound link (416), where the additional outbound link (416) includes a number N of conductive pathways connected to a first memory buffer device (444) in the first memory layer (456) so as to conduct all outbound memory signals from the first memory buffer device (444) in the first memory layer (456) to at least two additional memory buffer devices (448, 450) in an additional memory layer (458). In this example, the additional outbound link (416) includes a number N of conductive pathways that is equal to the number N of conductive pathways in the outbound link (406) connecting the memory controller (402) to the memory buffer devices (444, 446) in the first memory layer (456).

Figure 7:
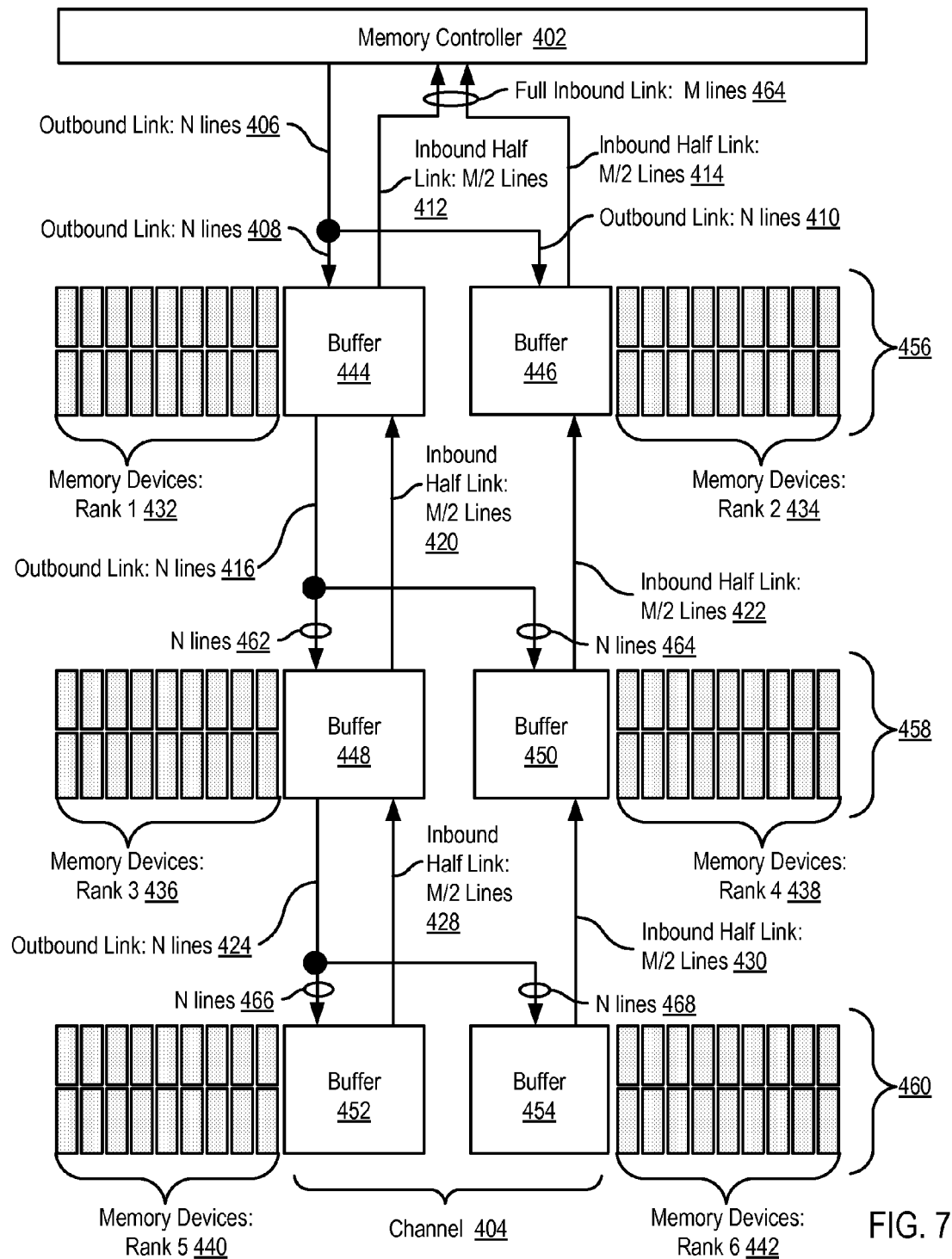
FIG. 7 sets forth a functional block diagram illustrating a further exemplary memory system according to embodiments of the present invention.

The memory system of FIG. 7 also includes the at least two additional memory buffer devices (448, 450) in the additional memory layer (458), where each additional memory buffer device (448, 450) is connected (462, 464) to the additional outbound link (416) so as to receive through the additional outbound link (416) and through the first memory buffer device (444) in the first memory layer (456) all outbound memory signals from the memory controller (402). In other words, in the example memory system architecture of FIG. 7, there are no partial outbound links as there are in the memory system of FIG. 4. Each outbound link in the example of FIG. 7 carries all outbound memory signals from memory controller (402).

In addition in the example of FIG. 7, at least one memory buffer device in the first memory layer is connected through no additional outbound link to any additional memory buffer device of the additional memory layer—and this is true for each memory layer. In this example, where there are only two memory buffer devices per memory layer, one memory buffer device is connected to an outbound link that carries all outbound memory signals to both memory buffer devices in the next additional memory layer, and the other memory buffer device in each memory layer is connected to no outbound link. In the first memory layer (456), memory buffer device (444) is connected to outbound link (416) that carries all outbound memory signals to both memory buffer devices (448, 450) in memory layer (458), and memory buffer device (446) is connected to no outbound link. In the second memory layer (458), memory buffer device (448) is connected to outbound link (424) that carries all outbound memory signals to both memory buffer devices (452, 454) in memory layer (460), and memory buffer device (450) is connected to no outbound link. And so on. There are only three memory layers illustrated here, but this architecture may be extended to any number of memory layers.

In view of this explanation, readers will recognize that the benefits of the outbound link architecture of the example of FIG. 7 include a substantial reduction in the physical complexity of the outbound channel lines in an architecture in which half the memory modules are simply not connected at all to outbound channels. The benefits of the outbound link architecture of the example of FIG. 7 also include substantial reduction in power consumption and in on-chip circuitry of memory buffer devices, half of which in this architecture need to have no outbound output driver circuitry whatsoever.

Inbound Architecture: Partial Links With Sliced Memory

In the memory system of FIG. 7, the memory is sliced so that each memory buffer device in a layer of memory administers only a portion of the memory addressed by an outbound memory signal from the memory controller. Unlike the example of FIG. 4 where each memory address buffer administered memory devices representing a separate segment of the overall memory address space, in the example of FIG. 7, all memory buffer devices in a memory layer administer memory devices representing the same segment of memory address space—with a portion of the memory for each address administered by each rank of memory devices in a memory layer.

The memory system of FIG. 7 also includes an inbound link (465), that is, a full inbound link that includes two or more partial inbound links (412, 414). Each partial inbound link is connected from a memory buffer device (444, 446) of the first memory layer to the memory controller (402) for transmission of inbound memory signals from each memory buffer device (444, 446) in the first memory layer (456) to the memory controller (402). In this example, each partial inbound link (412, 414) includes a portion of the conductive pathways of the inbound link, where each partial inbound link carries inbound memory signals representing the contents of a portion of the memory addressed by an outbound read memory signal from the memory controller. In particular in this example, the inbound link (465), referred to as a 'full' inbound link in FIG. 7, includes M conductive pathways or 'lines,' and each partial inbound link (412, 414), referred to as a 'half link' in FIG. 7, includes M/2 lines. If M were 14, then each partial link in this example would include 7 lines, and each partial inbound link would carry inbound memory signals representing the contents of one half of the memory requested by any outbound read memory signal from memory controller (402). The half links (412, 414) are effectively combined into a full inbound link (465) at the memory controller (402), so that the full inbound link (465) carries inbound memory signals representing the entire contents of a portion of memory addressed by an outbound read memory signal or packet from the controller.

Consider for further explanation an example in which an outbound memory packet that addresses memory within the memory space administered by memory buffer devices (444, 446). Both memory buffer devices (444, 446) receive the same packet through link (406). Unlike the example of FIG. 4 where only one of the memory buffer devices would recognize the packet as its responsibility, in this example, both memory buffer devices (444, 446) are configured to decode the packet as theirs because both memory buffer devices serve the same address space. If the packet represents a write instruction, memory buffer device (444) stores half the write data from the packet in the memory devices in rank 1 (432) beginning at a memory address designated in the packet header and memory buffer device (446) stores the other half in memory devices in rank 2 (434) beginning at the same memory address as designated in the packet header.

If the outbound memory packet represents a read instruction for read data from the memory space administered by memory buffer devices (444, 446), memory buffer device (444) reads half the read data from memory devices in rank 1 (432) beginning from the memory address designated in the packet header and memory buffer device (446) reads the other half of the read data from memory devices in rank 2 (434) beginning at the same memory address as designated in the packet header. Memory buffer device (444) then transmits its half of the read data back to the memory controller (402) on inbound half link (412), and memory buffer device (446) transmits its half of the read data back to memory controller (402) on inbound half link (414). The transmissions of the read data from the memory buffer devices are synchronized so that memory controller (402) receives the read data from both inbound half links (412, 414) as though the combined inbound half links were a single full inbound link (465).

Inbound Cascaded Architecture: Partial Links With Sliced Memory

The memory system of FIG. 7 also includes additional partial inbound links (420, 422), where each additional partial inbound link includes a number of conductive pathways connected to a memory buffer device of the first memory layer so as to conduct to the memory buffer device (444, 446) of the first memory layer (456) memory signals from an additional memory buffer device (448, 450) of an additional memory layer (458). In this example, each additional inbound link (420, 422) includes a number of conductive pathways that is less than the number of conductive pathways in the inbound link (464) connecting the memory controller (402) to the memory buffer devices (444, 446) in the first memory layer (456).

The memory system of FIG. 7 also includes at least two additional memory buffer devices (448, 450) in an additional memory layer (458), where each additional memory buffer device is connected to one of the additional partial inbound links (420, 422) so as to communicate from the additional memory buffer device (448, 450) to one of the memory buffer devices (444, 446) of the first level of memory (456) all memory signals to be transmitted to the memory controller (402) from each memory buffer device (444, 446) of the first memory layer (456).

In particular in this example, the inbound link (465), the 'full' inbound link of the example of FIG. 7, includes M conductive pathways or 'lines,' and each additional partial inbound link (420, 422), 'half links' in the example of FIG. 7, includes M/2 lines. If M were 14, then each additional partial inbound link in this example would include 7 lines, and each additional partial inbound link would carry inbound memory signals representing the contents of one half of the memory requested by an outbound read memory signal from memory controller (402). The inbound half links (420, 422) are effectively combined into a full inbound link (465) at the memory controller (402), so that the full inbound link (465) carries inbound memory signals representing the entire contents of a portion of memory addressed by an outbound read memory signal or packet from the controller.

Readers will recognize from this description that the memory system of FIG. 7 implements a kind of sliced memory architecture with partial inbound links between memory layers. The memory system of FIG. 7 also includes a third memory layer (460) to illustrate the extension of the sliced memory architecture with partial inbound links to additional memory layers with inbound links (428, 430) between memory buffer devices (448, 450) in memory layer (458) and memory buffer devices (452, 454) in memory layer (460). Only three memory layers (456, 458, 460) are illustrated in the example memory system of FIG. 7, but readers will recognize that the sliced memory architecture with partial inbound links of FIG. 7 may be extended to any number of memory layers.

In view of this explanation, readers will recognize that the benefits of the sliced memory architecture with partial inbound links of the example memory system of FIG. 7 include a substantial reduction in the physical complexity of the inbound link lines and a substantial reduction in inbound link power requirements in an architecture in which there between memory layers only a number of partial inbound links amount in effect to a single inbound link.

Outbound Cascaded Architecture: Full Outbound Links From All Buffers In A Memory Layer With Some Buffers Initially Enabled and Other Buffers Initially Disabled On Outbound Link For further explanation, FIG. 8 sets forth a functional block diagram illustrating a further exemplary memory system according to embodiments of the present invention that, like the exemplary memory system of FIG. 4, includes a memory controller (502) and an outbound link (506), where the memory controller (502) is connected to the outbound link (506), and the outbound link (506) is composed of conductive pathways that conduct memory signals from the memory controller (502) to memory buffer devices (544, 546) in a first memory layer (556). Unlike the memory system of FIG. 4, however, the memory system of FIG. 8 includes a first additional outbound link (516), where the first additional outbound link (516) is connected to a first memory buffer device (544) of the first memory layer (556) so as to conduct memory signals received from the memory controller (502) through the first memory buffer device (544) of the first memory layer (556) to at least two additional memory buffer devices (548, 550) in an additional memory layer (558).

In this example, the first additional outbound link (516) is initially enabled. Initially enabling the first additional outbound link (516) may be carried out by configuring outbound output circuitry of memory buffer device (544) with tri-state drivers and configuring the memory buffer device so that at boot time its outbound output drivers are not in tri-state mode. A tri-state driver is an output driver circuit whose controls allow its output to be placed in a high impedance state, so that it appears non-existent to other devices connected to the same output. Connected to an outbound link, such a device appears is effectively disabled in tri-state mode and effectively enabled when non in tri-state mode.

Figure 8:
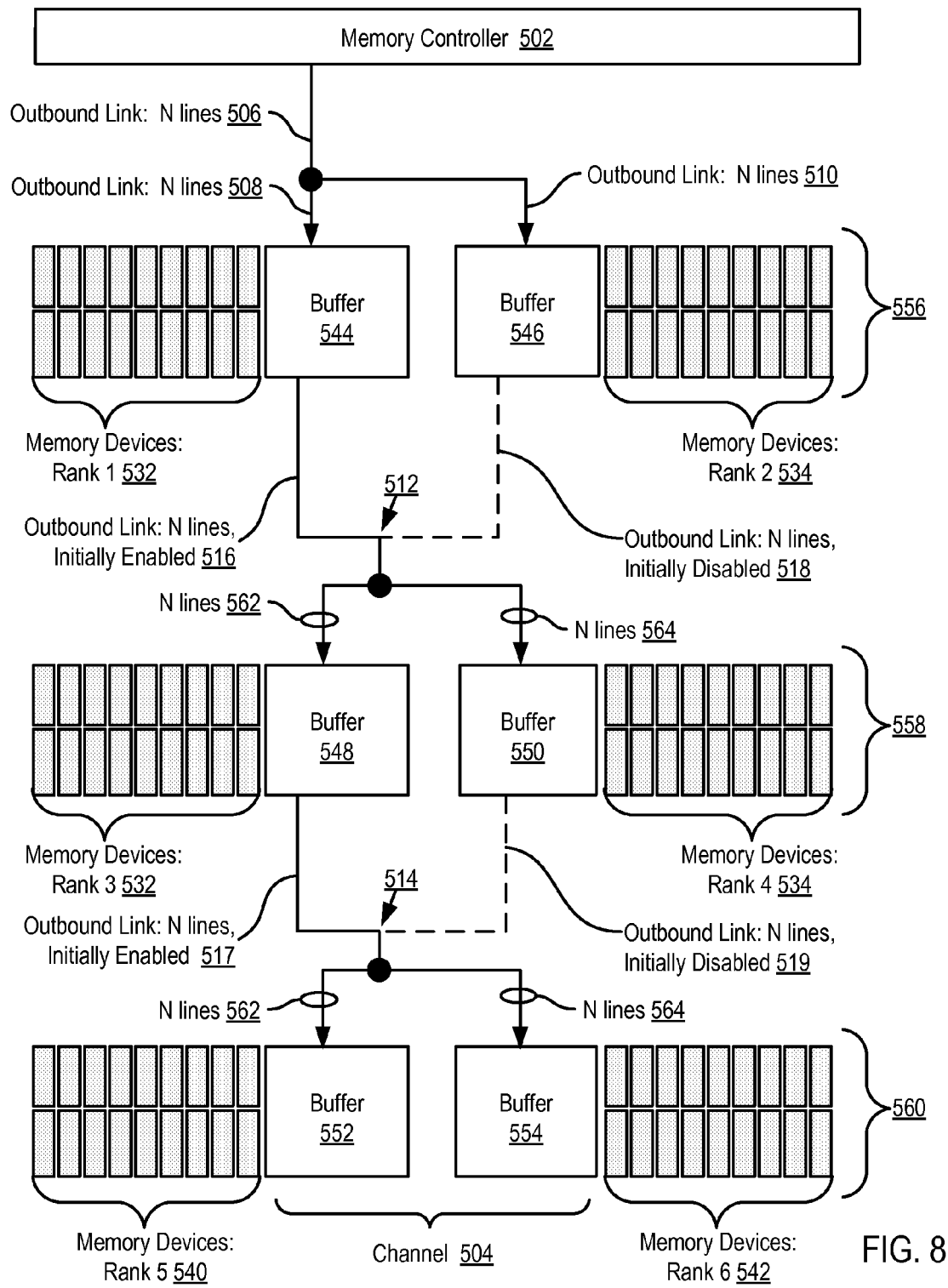
FIG. 8 sets forth a functional block diagram illustrating a further exemplary memory system according to embodiments of the present invention.

The memory system of FIG. 8 also includes a second additional outbound link (518). The second additional outbound link (518) is connected to a second memory buffer device (546) of the first memory layer (556) so as to conduct memory signals received from the memory controller (502) through the second memory buffer device (546) of the first memory layer (556) to the at least two additional memory buffer devices (548, 550) in the additional memory layer (558).

In the example of FIG. 8, the second additional outbound link (518) is initially disabled. Initially disabling the second additional outbound link (518) may be carried out by configuring outbound output circuitry of memory buffer device (546) with tri-state drivers and configuring the memory buffer device so that at boot time its outbound output drivers are in tri-state mode, presenting a high impedance to the second additional outbound link (518), rendering memory buffer device (546) practically non-existent, at least initially, with respect to second additional outbound link (518).

The example memory system of FIG. 8 includes the at least two additional memory buffer devices (548, 550) in the additional memory layer (558). Each such additional memory buffer device (548, 550) is connected (562, 564) to the first additional outbound link (516) and the second additional outbound link (518) so as to receive memory signals from the memory controller (502) through either the first additional outbound link (516) or the second additional outbound link (518).

In the example memory system of FIG. 8, the memory controller (502) is configured and enabled with the capability to detect a defect in the first memory buffer device (544) of the first memory layer (556), disable the first additional outbound link (516), and enable the second additional outbound link (518). Memory controller (502) may detect a defect in the first memory buffer device (516) by calculating a CRC value for a read packet created by and received from memory buffer device (544) and comparing that value with a CRC value in the packet.

Memory controller (502) may disable the first additional outbound link (516) by transmitting to memory buffer device (544) an instruction to place its outbound output drivers in tri-state mode, thereby isolating memory buffer device (544) from outbound link (516). An instruction to place outbound output drivers in tri-state mode may be transmitted in-band as part of the memory channel communications protocol or out-of-band through an I²C bus or a System Management Bus ('SMBus' or 'SMB') such as the one illustrated at reference (964) on FIG. 6. The in-band communication may be faster, but the in-band communication may not be available when a memory buffer device has failed.

Memory controller (502) may enable the second additional outbound link (518) by transmitting to memory buffer device (546) an instruction to remove its outbound output drivers from tri-state mode, thereby connecting memory buffer device (546) to outbound link (518). An instruction to remove outbound output drivers from tri-state mode may be transmitted in-band as part of the memory channel communications protocol or out-of-band through a system management bus ('SMBus') such as the one illustrated at reference (964) on FIG. 6.

In view of this explanation, readers will recognize that the benefits of the outbound link architecture of the example of FIG. 8 include a substantial reduction in the physical complexity of the outbound channel lines and substantial reduction in power consumption in output driver circuitry of memory buffer devices which now need have only about one-half the outbound output driver circuits required, for example, by a prior art system such as the one illustrated in FIG. 1. In addition, the benefits of the outbound link architecture of the example of FIG. 8 include a substantial increase of the overall robustness of the memory system which now may suffer complete failure of the ability of one or more memory buffer devices as data communications components in a memory communications network and, particularly when a failing memory buffer device remains capable of correct access to the memory rank that it servers, continue to function at full capacity.

Inbound Architecture: Serpentine Links

Figure 9:
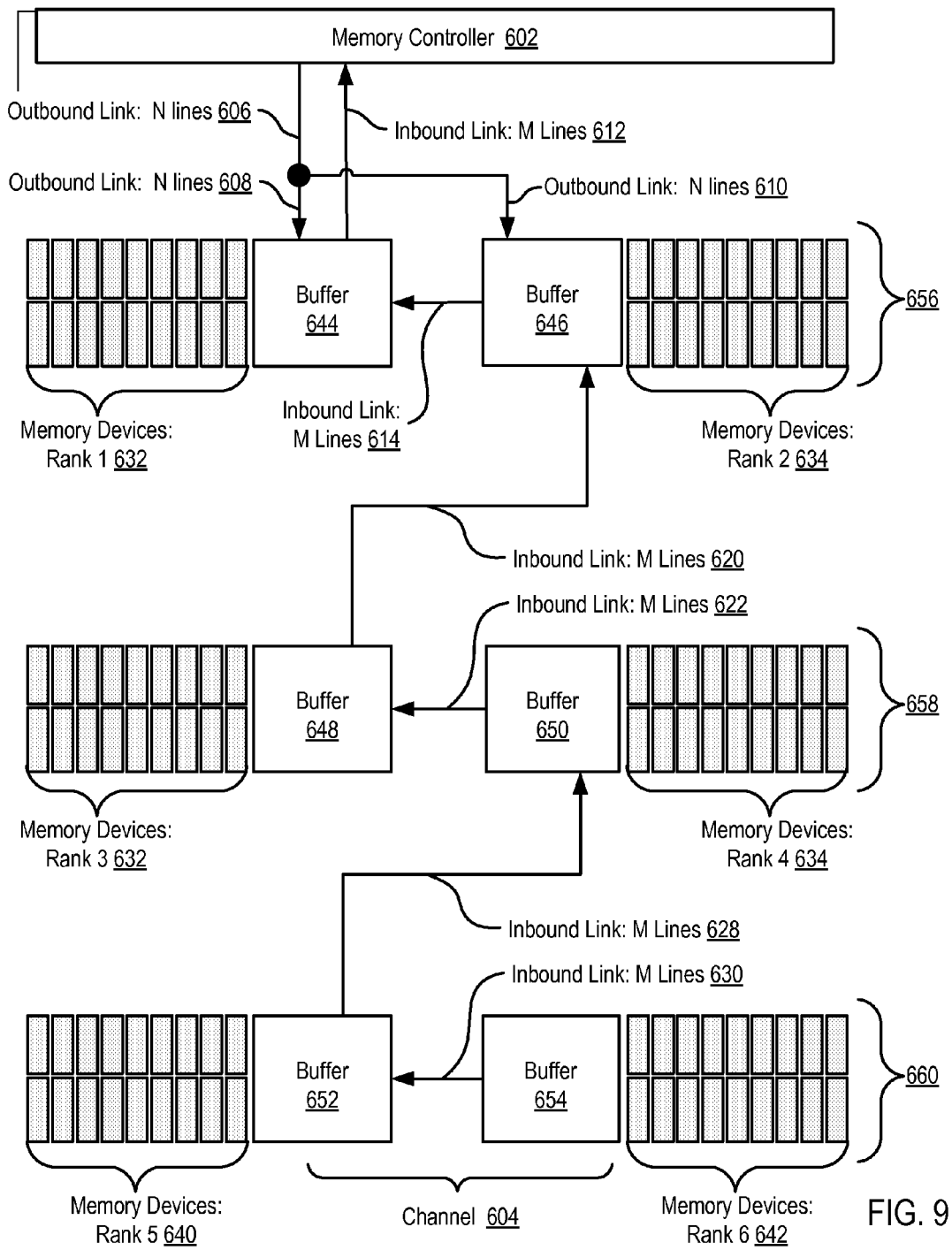
FIG. 9 sets forth a functional block diagram illustrating a further exemplary memory system according to embodiments of the present invention.

For further explanation, FIG. 9 sets forth a functional block diagram illustrating a further exemplary memory system according to embodiments of the present invention that, like the exemplary memory system of FIG. 4, includes a memory controller (602) and an outbound link (606), where the memory controller (602) is connected to the outbound link (606), and the outbound link (606) is composed of conductive pathways that conduct memory signals from the memory controller (602) to memory buffer devices (644, 646) in a first memory layer (656). For clarity of explanation regarding the memory system of FIG. 9, the remaining outbound links, which are part of channel (604), are not shown in FIG. 9.

Unlike the memory system of FIG. 4, however, the memory system of FIG. 9 includes a first inbound link (612) that is connected from a first memory buffer device (644) in the first memory layer to the memory controller (602) so as to communicate inbound memory signals from the first memory buffer device (644) to the memory controller. The memory system of FIG. 9 also includes a second inbound link (614) that is connected from a second memory buffer device (646) in the first memory layer (656) to the first memory buffer device (644) in the first memory layer (656) so as to communicate inbound memory signals from the second memory buffer device (646) to the first memory buffer device (644) and through the first memory buffer device (644) and the first inbound link (612) to the memory controller (602).

The memory system of FIG. 9 also includes a third inbound link (620) that is connected from a first memory buffer device (648) in an additional memory layer (658) to the second memory device (646) in the first memory layer (656) so as to communicate inbound memory signals from the first memory buffer device (648) in the additional memory layer (658) to the second memory buffer device (646) in the first memory layer (656) and through the second memory buffer device (646) in the first memory layer (656) and through the second inbound link (614) and through the first memory buffer device (644) in the first memory layer (656) and through the first inbound link (612) to the memory controller (602).

The memory system of FIG. 9 also includes a fourth inbound link (622) that is connected from a second memory buffer device (650) in the second memory layer (658) to the first memory buffer device (648) in the second memory layer (658) so as to transmit inbound memory signals from the second memory buffer device (650) in the second memory layer (658) to the first memory buffer device (648) in the second memory layer (658) and through the first memory buffer device (648) in the second memory layer (658) and through the third inbound link (620) and through the second memory buffer device (646) in the first memory layer (656) and through the second inbound link (614) and through the first memory buffer device (644) in the first memory layer (656) and through the first inbound link (612) to the memory controller (602).

Readers will recognize from this description that the memory system of FIG. 9 implements a kind of serpentine inbound link architecture with both an inbound link between memory buffer devices within a memory layer and also an inbound link between memory buffer devices in different memory layers. The memory system of FIG. 9 also includes a third memory layer (660) to illustrate the extension of the serpentine inbound link architecture to additional memory layers with inbound link (630) between memory buffer devices (652, 654) within memory layer (660) and inbound link (628) between memory buffer devices (652, 650) in different memory layers (658, 660). Only three memory layers (656, 658, 660) are illustrated in the example memory system of FIG. 9, but readers will recognize that the serpentine inbound link architecture of FIG. 9 may be extended to any number of memory layers.

In view of this explanation, readers will recognize that the benefits of the serpentine inbound link architecture of the example memory system of FIG. 9 include a substantial reduction in the physical complexity of the inbound channel lines in an architecture in which there may be for example only one inbound link between each memory layer. The benefits of the inbound link architecture of the example of FIG. 9 also include substantial reduction in power consumption in an architecture in which the inbound links between memory buffer devices in the same memory layer may be on the same planar, the same memory module substrate or the same backplane or motherboard, with no intervening connectors.

Finally it is useful to note that the architectural arrangement of memory buffer devices with respect to ranks and layers of memory in this specification is a logical architecture rather than a physical architecture. Although the memory buffer devices of the example prior art memory system of FIG. 1 are illustrated in a particular physical architecture, in memory modules with ranks of memory devices, that architecture is not a limitation of the present invention. It is well within the scope of the present invention for memory buffers devices to be physically located on a memory module (a DIMM or a SIMM) with memory devices, on a planar such as a backplane or a motherboard while related memory devices are on a memory module mounted on the backplane or motherboard, on the same backplane or motherboard with related memory devices, on in any other physical architecture as may occur to those of skill in the art.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A memory system comprising:
   a memory controller;
   an outbound link, the memory controller connected to the outbound link, the outbound link comprising a number of conductive pathways that conduct memory signals from the memory controller to memory buffer devices in a first memory layer;
   at least two memory buffer devices in a first memory layer, each memory buffer device in the first memory layer connected to the outbound link to receive memory signals from the memory controller; and
   a plurality of separate inbound links, one inbound link connected from each memory buffer device in the first memory layer to the memory controller for transmission of memory signals from each memory buffer device in the first memory layer to the memory controller.

2. The memory system of claim 1 wherein the at least two memory buffer devices in the first memory layer are synchronized with one another for receipt of outbound memory signals through the outbound link.

3. The memory system of claim 2 wherein the at least two memory buffer devices in the first memory layer synchronized with one another further comprises the at least two memory buffer devices in the first memory layer each synchronized at the same time with the memory controller to a predetermined threshold measure of synchronization.

4. The memory system of claim 1 further comprising at least two layers of memory, each memory layer further comprising at least two memory buffer devices, each layer of memory connected for communication of memory signals by at least one outbound link to at least one memory buffer device in the memory layer, each layer of memory connected for communication of memory signals by at least one inbound link from at least one memory buffer device in the memory layer, the inbound links characterized by an inbound link speed, the outbound links characterized by an outbound link speed, the inbound link speed dependent upon the outbound link speed.

5. The memory system of claim 1 further comprising:
additional outbound links, each additional outbound link comprising a number of conductive pathways connected to a memory buffer device of the first memory layer so as to conduct memory signals from a memory buffer device in the first memory layer to two or more additional memory buffer devices in an additional memory layer, each additional outbound link comprising a number of conductive pathways smaller than the number of conductive pathways in the outbound link connecting the memory controller to the memory buffer devices in the first memory layer; and
at least two additional memory buffer devices in an additional memory layer, each additional memory buffer device connected to at least two of the additional outbound links so as to receive all memory signals transmitted from the memory controller on the outbound link between the memory controller and the memory buffer devices in the first memory layer.

6. The memory system of claim 5 wherein the at least two memory buffer devices in the additional memory layer are synchronized with one another for receipt of outbound memory signals through the outbound link.

7. The memory system of claim 6 wherein the at least two memory buffer devices in the additional memory layer synchronized with one another further comprises the at least two memory buffer devices in the additional memory layer each synchronized at the same time to a predetermined threshold measure of synchronization with a memory buffer device in the first layer of memory to which the memory buffer devices in the second layer of memory are connected by an outbound link.

8. The memory system of claim 1 further comprising:
additional inbound links, each additional inbound link comprising a number of conductive pathways connected to a memory buffer device of the first memory layer so as to conduct to the memory buffer device of the first memory layer memory signals from an additional memory buffer device of an additional memory layer, each additional inbound link comprising a number of conductive pathways that is equal to the number of conductive pathways in the inbound links connecting the memory controller to the memory buffer devices in the first memory layer; and
at least two additional memory buffer devices in an additional memory layer, each additional memory buffer device connected to one of the additional inbound links so as to send from the additional memory buffer device to one of the memory buffer devices of the first level of memory all memory signals to be transmitted to the memory controller from each memory buffer device of the first memory layer.

9. The memory system of claim 1 further comprising:
an additional outbound link, the additional outbound link comprising a number of conductive pathways connected to a first memory buffer devices in the first memory layer so as to conduct all outbound memory signals from the first memory buffer device in the first memory layer to at least two additional memory buffer devices in an additional memory layer, the additional outbound link comprising a number of conductive pathways that is equal to the number of conductive pathways in the outbound link connecting the memory controller to the memory buffer devices in the first memory layer; and
at least two additional memory buffer devices in an additional memory layer, each additional memory buffer device connected to the additional outbound link so as to receive through the additional outbound link and through the first memory buffer device in the first memory layer all outbound memory signals from the memory controller,
wherein at least one memory buffer device in the first memory layer is connected through no additional outbound link to any additional memory buffer device of the additional memory layer.

10. The memory system of claim 1 wherein:
the memory is sliced so that each memory buffer device in a layer of memory administers only a portion of the memory addressed by an outbound memory signal from the memory controller, and the memory system further comprises:
an inbound link, the inbound link comprising two or more partial inbound links, each partial inbound link connected from a memory buffer device of the first memory layer to the memory controller for transmission of inbound memory signals from each memory buffer device in the first memory layer to the memory controller, each partial inbound link comprising a portion of the conductive pathways of the inbound link, each partial inbound link carrying inbound memory signals representing the contents of a portion of the memory addressed by an outbound read memory signal from the memory controller.

11. The memory system of claim 10 further comprising:
additional partial inbound links, each additional partial inbound link comprising a number of conductive pathways connected to a memory buffer device of the first memory layer so as to conduct to the memory buffer device of the first memory layer memory signals from an additional memory buffer device of an additional memory layer, each additional inbound link comprising a number of conductive pathways that is less than the number of conductive pathways in the inbound link connecting the memory controller to the memory buffer devices in the first memory layer; and
at least two additional memory buffer devices in an additional memory layer, each additional memory buffer device connected to one of the additional partial inbound links so as to communicate from the additional memory buffer device to one of the memory buffer devices of the first level of memory all memory signals to be transmitted to the memory controller from each memory buffer device of the first memory layer.

12. The memory system of claim 1 further comprising:
a first additional outbound link, the first additional outbound link connected to a first memory buffer device of the first memory layer so as to conduct memory signals received from the memory controller through the first memory buffer device of the first memory layer to at least two additional memory buffer devices in an additional memory layer, the first additional outbound link initially enabled;

a second additional outbound link, the second additional outbound link connected to a second memory buffer device of the first memory layer so as to conduct memory signals received from the memory controller through the second memory buffer device of the first memory layer to the at least two additional memory buffer devices in the additional memory layer, the second additional outbound link initially disabled; and the at least two additional memory buffer devices in the additional memory layer, each additional memory buffer device connected to the first additional outbound link and the second additional outbound link so as to receive memory signals from the memory controller through either the first additional outbound link or the second additional outbound link.

13. The memory system of claim 12 wherein the memory controller further comprises the capability of:

detecting a defect in the first memory buffer device of the first memory layer;

disabling the first additional outbound link; and enabling the second additional outbound link.

14. The memory system of claim 1 further comprising:

a first inbound link, the first inbound link connected from a first memory buffer device in the first memory layer to the memory controller so as to communicate inbound memory signals from the first memory buffer device to the memory controller; and a second inbound link, the second inbound link connected from a second memory buffer device in the first memory layer to the first memory buffer device in the first memory layer so as to communicate inbound memory signals from the second memory buffer device to the first memory buffer device and through the first memory buffer device and the first inbound link to the memory controller.

15. The memory system of claim 14 further comprising:

a third inbound link, the third inbound link connected from a first memory buffer device in an additional memory layer to the second memory device in the first memory layer so as to communicate inbound memory signals from the first memory buffer device in an additional memory layer to the second memory buffer device in a first memory layer and through the second memory buffer device in a first memory layer and through the second inbound link and through the first memory buffer device in the first memory layer and through the first inbound link to the memory controller; and a fourth inbound link, the fourth inbound link connected from a second memory buffer device in the second memory layer to the first memory buffer device in the second memory layer so as to transmit inbound memory signals from the second memory buffer device in the second memory layer to the first memory buffer device in the second memory layer and through the first memory buffer device in the second memory layer and through the third inbound link and through the second memory buffer device in a first memory layer and through the second inbound link and through the first memory buffer device in the first memory layer and through the first inbound link to the memory controller.

* * * * *